Figure 1:
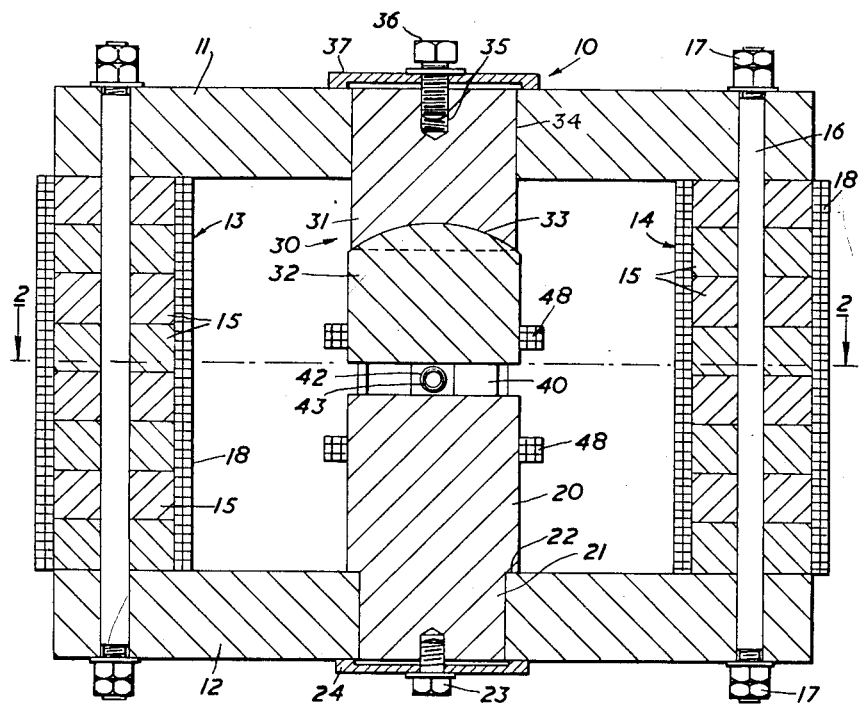

April 17, 1962  E. WATSON  3,030,556
NUCLEAR MAGNETIC RESONANCE DETECTORS
Filed Oct. 15, 1958

INVENTORS
EDWARD WATSON

BY
Watson, Cole, Grindle & Watson
ATTORNEY

United States Patent Office 3,030,556
Patented Apr. 17, 1962

3,030,556
NUCLEAR MAGNETIC RESONANCE DETECTORS
Edward Watson, Hayes, England, assignor, by mesne assignments, to Fairey Aviation Limited, Hayes, England, a company of Great Britain
Filed Oct. 15, 1958, Ser. No. 767,435
Claims priority, application Great Britain Feb. 13, 1958
5 Claims. (Cl. 317—158)

This invention relates to magnet assemblies. The invention is particularly, though not exclusively, applicable to magnet assemblies for use in nuclear magnetic resonance detectors, in which it is a requirement that the magnetic field in the air gap should be homogeneous to an extremely high degree of accuracy and should also remain constant throughout the duration of a test. If the magnetic field is not homogeneous to an extremely high order of accuracy, say one part in a million or better, the resonance point will not be sharply defined, or a clearly detectable resonance signal may not be obtained at all. For setting up the field, the faces of the pole pieces defining the air gap in which the sample and the radio-frequency test coil are received must be formed and disposed in relation to one another to a correspondingly high degree of accuracy. Thus if the air gap is one inch thick, the faces of the pole pieces must be accurately parallel to one another to within about one millionth of an inch. This does not of course mean that the gap must be exactly one inch thick, but whatever value of thickness it has at any one part, the remainder of the gap must be of the same thickness to that order of accuracy.

The present invention is concerned with establishing a magnetic field of a high order of homogeneity.

The present invention is an improvement of that set forth in co-pending U.S. patent application Serial No. 767,434 relating to Nuclear Magnetic Resonance Detectors filed October 15, 1958, in the name of Edward Watson and Mervin Sydney Avery, and now abandoned. According to that invention a magnet assembly, more especially a permanent magnet assembly, includes a pair of pole pieces having faces defining an air gap accurately formed, as by lapping, characterised in that one pole piece is mounted so as to be movable relatively to the other, at least during setting up, to take up misalignment, and at least one non-magnetic slip gauge is inserted between the pole faces to space them apart and hold them accurately parallel.

A single slip gauge of horseshoe shape, or one of annular shape with one or more radial holes for probes, may be employed, but preferably the pole faces are held apart and kept parallel by three or more, conveniently four, slip gauges of equal length distributed round the axis of the pole pieces.

In one form of the invention the assembly comprises two parallel permanent magnets of bar or equivalent form having their ends interconnected by a pair of yokes, and pole pieces midway between the bar magnets extending towards one another from the yokes, at least the part of one pole piece adjacent the air gap being movable relatively to the remainder of the magnetic circuit to take up misalignment.

According to the present invention at least the part of one pole piece adjacent the air gap has a part-spherical surface presented to the adjacent part of the magnetic circuit and the latter is formed with a co-operating part-spherical surface, the two part-spherical surfaces having their centre of curvature in the region of the centre of the air gap. One pole piece may then be received in a hole in the adjacent yoke so as to be capable of movement longitudinally towards and away from the other pole piece. Thus in a convenient arrangement one pole piece includes a root portion and a slipper portion affording the pole piece, the two portions affording the co-operating part-spherical surfaces so as to permit limited rocking movement of the slipper portion relatively to the root portion whilst the root portion is received in a hole in the adjacent yoke so as to be capable of movement longitudinally towards and away from the other pole piece.

When the magnet assembly is to be employed for nuclear magnetic resonance investigations a probe for a sample, and a radio-frequency coil surrounding it, may be supported in the air gap.

After the magnet has been set up the pole piece may, if desired, be clamped in position and the slip gauges removed, but in general it will be convenient to leave the slip gauges in position so as to avoid any possibility of disturbing the accurate setting of the pole pieces. Normally no clamping will be required since the powerful attraction between the pole pieces will clamp the slip gauges firmly in position.

The invention enables the pole faces to be set up extremely quickly and easily to produce a magnetic field of the desired degree of homogeneity in the central portion of the air gap.

Figure 2:
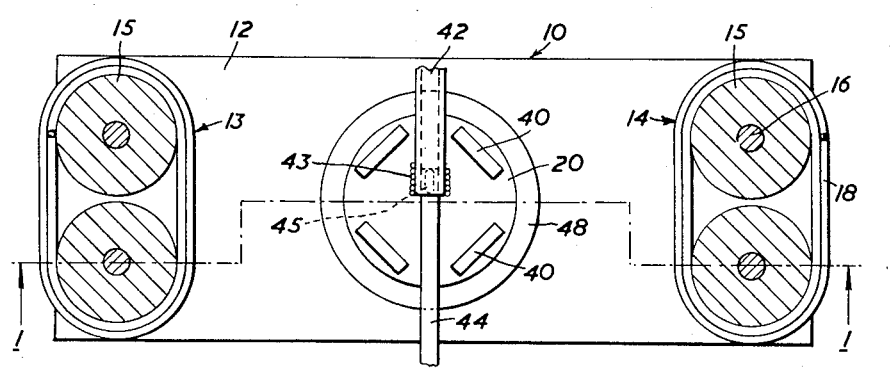

The invention may be carried into practice in various ways but one specific embodiment will be described by way of example with reference to the accompanying drawings, in which:

FIGURE 1 is a sectional elevation of a permanent magnet assembly taken on the line 1—1 of FIGURE 2, and FIGURE 2 is a sectional plan on the line 2—2 of FIGURE 1.

The magnet assembly 10 comprises upper and lower soft iron yoke members 11 and 12 of rectangular section interconnecting the ends of two sets of parallel permanent magnets of bar or equivalent form 13 and 14. Each set of permanent magnets may conveniently be built-up from two or more columns of rings 15 of suitable magnetic material each column of rings being threaded on a bolt 16 passing through holes in the adjacent ends of the yokes and clamped up by nuts 17.

Conveniently each set of permanent magnets is encircled by a coil 18 of stout wire which plays no part in the operation of the assembly but is provided purely for initial magnetization. A heavy surge of current is discharged through these coils in order to magnetize the rings 15.

Projecting upwardly from the middle of the lower yoke is a lower soft iron pole piece 20 of cylindrical shape. This has a lower end portion 21 of reduced diameter which fits into a hole in the yoke and terminates in a shoulder 22 resting on the upper surface of the yoke. A clamping bolt 23 passes through a bridge or cap 24 into a threaded hole in the end of the pole piece and the cap bears on the under-surface of the yoke round the pole piece so as to clamp it rigidly in position.

Projecting downwardly from the middle of the upper yoke member is an upper pole piece 30 also of generally cylindrical form constructed in two portions, a root portion 31 and a slipper portion 32. These two portions are formed with co-operating part-spherical surfaces 33, the centre of curvature of which lies in the region of the centre of the air gap between the upper and lower pole pieces. The root portion 31 is a sliding fit in a hole 34 in the centre of the upper yoke member, for example it may fit with a clearance of perhaps a thousandth of an inch on the diameter. Accordingly the root portion 31 of the upper pole piece is free to slide up and down longitudinally whilst the slipper portion can turn relatively to the root portion about a centre lying in the region of the air gap. The root portion has in its upper end a threaded bore 35 to receive a screw 36 passing through a bridge or cap 37 which is similar in construction to the bridge or cap 24 but is used rather differently.

The pole pieces are provided with accurately formed pole faces at their inner ends which are spaced apart to define between them an air gap for receiving the sample and a radio-frequency test coil. The pole faces may be either flat or of similar spherical shape, one convex and the other concave, the radius of curvature in the latter case being identical for the two surfaces and being very large in relation to the gap thickness. The pole faces are shaped to the required extremely high degree of accuracy, of the order of one in a million, by a hand lapping process, one face being lapped on the other and the positions of the poles being interchanged during the lapping operation to cancel out any inequality due to the effect of gravity. By the use of a proprietary brand of lapping compound, surface finishes accurate to better than one in a million can be obtained.

To space the finished pole faces accurately apart in strict parallelism, a set of four identical slip gauges 40 is provided, formed to the required degree of dimensional accuracy and made of a non-magnetic material such as glass quartz or bronze. The gauges are inserted between the spaced pole faces at points spaced around the periphery of the air gap, and the pole faces are then allowed to move towards one another by withdrawing the adjusting screw 36 until they rest on the slip gauges.

The magnetic attraction between the various parts of the magnetic circuit clamps the whole magnetic assembly rigidly together, and in order to separate it for modification or adjustment it is necessary to make use of the screw 36 to withdraw the upper pole piece and release the slip gauges.

A probe 42 carrying a radio-frequency coil 43 can then be extended into the air gap from one side whilst a second probe 44 carrying a sample 45 of the material to be investigated is inserted from the opposite direction so that the sample enters the radio-frequency coil. The axis of the radio-frequency coil is transverse to the axis of the pole pieces producing the main magnetic field in the gap, and current is passed through the coil to set up a transverse radio-frequency magnetic field in the air gap. When the frequency of the transverse magnetic field set up by the test coil is in synchronism with the resonance frequency of the nuclei of the sample, a state of nuclear magnetic resonance will be set up in the latter and increased power will be absorbed by it and will be detected by suitable means such as a radio receiver. The precise details of the radio-frequency generator and of the radio receiver, however, form no part of the present invention and will not be described in detail.

The pole pieces are provided with exciting coils 48 for connection to a source of electric current for the purpose of enabling the steady field across the air gap to be varied.

Whilst a permanent magnet has been described, and is generally convenient, an electromagnet may in certain cases be employed instead for providing the steady flux across the air gap. Again, the construction of the magnet may vary; in particular one pole piece may have a part-spherical surface co-operating with a complementary surface afforded by the adjacent yoke member whilst the other pole piece fits in a hole in its yoke member and is free to shift longitudinally.

Whilst the invention has been described in relation to a nuclear magnetic resonance detector, it will be understood that it is equally applicable to other forms of apparatus in which a magnetic field of extreme homogeneity is required to be set up in an air gap between opposed pole faces, for example betatron and cyclotron magnets and magnets for atomic work.

What I claim as my invention and desire to secure by Letters Patent is:

1. A magnet assembly including a pair of pole pieces having faces defining an air gap accurately formed, as by lapping, in which at least part of one pole piece adjacent the air gap has a part-spherical surface on the end opposite the air gap and the remaining part of said one pole piece is formed with a co-operating part-spherical surface, the two part-spherical surfaces having their centre of curvature in the region of the centre of the air gap so that at least the said part of one pole piece is movable relatively to the other pole piece to take up misalignment of said faces, and at least one non-magnetic slip gauge inserted between said faces to space them apart and hold them accurately parallel during use.

2. An assembly as claimed in claim 1 in which said faces are held apart and kept parallel by at least three slip gauges of equal length distributed round the center of said faces.

3. An assembly as claimed in claim 1 in which one pole piece includes a root portion and a slipper portion defining the pole piece, the two portions defining the co-operating part-spherical surfaces so as to permit limited rocking movement of the slipper portion relatively to the root portion, said assembly including a yoke adjacent said last mentioned pole piece and having a hole therein, said last mentioned pole piece being moveably mounted in said hole for movement towards and away from the other pole piece.

4. An assembly according to claim 1 including means defining at least one magnetic path between the ends of said pole pieces remote from said air gap, said last mentioned means including at least one permanent magnet.

5. An assembly according to claim 1, including a yoke adjacent one pole piece and having a hole therein, said last mentioned pole piece being slidably mounted in said hole for longitudinal movement towards and away from the other pole piece.

References Cited in the file of this patent

UNITED STATES PATENTS

| | | |
|---|---|---|
| 2,575,811 | Hofammann et al. | Nov. 29, 1951 |
| 2,664,527 | Reed | Dec. 29, 1953 |
| 2,819,431 | Maxwell | Jan. 7, 1958 |

FOREIGN PATENTS

| | | |
|---|---|---|
| 771,958 | Great Britain | Apr. 10, 1957 |

OTHER REFERENCES

Arnold: Physical Review; vol. No. 102, Number 1, April 1, 1956, pp. 136–150.